United States Patent
Bayh et al.

(10) Patent No.: US 6,789,016 B2
(45) Date of Patent: Sep. 7, 2004

(54) INTEGRATED AIRBORNE TRANSPONDER AND COLLISION AVOIDANCE SYSTEM

(75) Inventors: Carl Raymond Bayh, Ronkonkoma, NY (US); Paul F. Drobnicki, Holbrook, NY (US); Scott Esbin, Massapequa, NY (US); Michael Murphy, Centerport, NY (US); Randolph Purdy, Sayville, NY (US); David Wolff, Hauppauge, NY (US)

(73) Assignee: BAE Systems Information and Electronic Systems Integration Inc., Greenlawn, NY (US)

( * ) Notice: Subject to any disclaimer, the term of this patent is extended or adjusted under 35 U.S.C. 154(b) by 0 days.

(21) Appl. No.: 10/167,905

(22) Filed: Jun. 12, 2002

(65) Prior Publication Data

US 2003/0233192 A1 Dec. 18, 2003

(51) Int. Cl.[7] .............................. G06F 19/00; G06F 7/00
(52) U.S. Cl. ........................... 701/301; 701/120; 701/9; 701/14; 340/361; 342/30; 342/455; 342/176
(58) Field of Search .................................. 701/301, 302, 701/9, 8, 4, 3, 122, 207, 120, 14; 340/961, 973, 975, 945; 342/29, 32, 30, 36, 37, 42, 51, 455, 362, 360, 179, 176

(56) References Cited

U.S. PATENT DOCUMENTS

| | | | |
|---|---|---|---|
| 4,855,748 A | | 8/1989 | Brandao et al. |
| 4,910,526 A | * | 3/1990 | Donnangelo et al. ........ 342/455 |
| 5,077,673 A | * | 12/1991 | Brodegard et al. .......... 701/301 |
| 5,248,968 A | * | 9/1993 | Kelly et al. .................. 340/961 |
| 5,552,788 A | * | 9/1996 | Ryan et al. ..................... 342/30 |
| 5,570,095 A | | 10/1996 | Drouilhet, Jr. et al. |
| 5,805,111 A | | 9/1998 | Brettner, III |
| 6,262,679 B1 | | 7/2001 | Tran |
| 6,313,783 B1 | * | 11/2001 | Kuntman et al. .............. 342/32 |
| 6,433,729 B1 | * | 8/2002 | Staggs .......................... 342/29 |
| 6,459,411 B2 | * | 10/2002 | Frazier et al. ............... 342/455 |
| 2002/0011950 A1 | | 1/2002 | Frazier et al. |
| 2002/0075171 A1 | * | 6/2002 | Kuntman et al. ........... 340/961 |

OTHER PUBLICATIONS

BAE Systems, AN/APX–117(V) Common Transponder (2 pages).

BAE Systems, Mid–Air Collision Avoidance System (2 sides).

FAA, Introduction to TCAS II Version 7 (Nov. 2000) (45 pages).

(List continued on next page.)

Primary Examiner—Thomas G. Black
Assistant Examiner—Ronnie Mancho
(74) Attorney, Agent, or Firm—Law Office of Leo Zucker

(57) ABSTRACT

An airborne collision avoidance system includes a receiver stage constructed and arranged to detect (a) at a first radio frequency, first interrogation signals, and first collision resolution advisory (RA) signals transmitted from other nearby aircraft, and (b) at a second radio frequency, first acquisition signals including position information with respect to the nearby aircraft, and first reply signals from the nearby aircraft. A transmitter stage is constructed to produce (a) at the first radio frequency, second interrogation signals and second collision RA signals, and (b) at the second radio frequency, second acquisition signals including position information with respect to the given aircraft, and second reply signals from the given aircraft in response to the first interrogation signals. Tracking and collision avoidance information derived by a system processor from the detected first acquisition and first RA signals is shown on a cockpit display. The receiver and the transmitter stages are coupled to a single pair of upper and lower fuselage antennas through a T/R switch module.

30 Claims, 5 Drawing Sheets

OTHER PUBLICATIONS

Honeywell, Enhanced Traffic Alert & Collision Avoidance System; System Components of the CAS–81 (5 pages).

G.A. VanSicle, Allied AIr Indentification, Proc. Tactical Communications Conference 1996, IEEE, pp. 365–70 (Apr. 1996), ISBN: 0–7803–3658–5/96.

D. Diefers, et al., Concept Design for a Low Cost Cockpit Display/Collision Avoidance System For General Aviation Aircraft, Position Location and Navigation Symposium 1996, IEEE pp. 352–359 (Apr. 1996), ISBN: 0–7803–3085–4/96.

* cited by examiner

REMOTE CONTROL UNIT (RCU)

INTEGRATED AIRBORNE TRANSPONDER AND COLLISION AVOIDANCE SYSTEM

BACKGROUND OF THE INVENTION

1. Field of the Invention

This invention relates generally to airborne tracking and collision avoidance systems.

2. Discussion of the Known Art

Most passenger and commercial airline aircraft in the United States are required to be equipped with a so-called Traffic Alert and Collision Avoidance System (TCAS), either version "TCAS I" or "TCAS II". TCAS equipment operates independently of an existing ground-based air traffic control (ATC) system. A given TCAS-equipped aircraft detects signals from transponders of other nearby aircraft which may or may not be TCAS-equipped, in response to interrogation signals emitted from the given TCAS aircraft. Based on the detected transponder signals, the TCAS pilot may be advised to take appropriate action (e.g., climb or descend) if any of the nearby aircraft poses a collision threat.

TCAS I displays traffic advisories (TAs) and warnings of nearby aircraft to assist the pilot in visual acquisition of aircraft that pose a collision threat. TCAS II provides the TAs as well as resolution advisories (RAs) to the pilot, wherein the RAs serve to cause a display and an audible alert of certain avoidance maneuvers. For example, if two TCAS II-equipped aircraft approach one another on a potential collision course, one pilot may be instructed to climb and the other pilot instructed to descend in order to resolve the collision threat. A first one of the two approaching TCAS II aircraft (the "master") transmits its determined RA to the second aircraft ("the slave"), and the latter acknowledges by formulating a complementary maneuver and transmitting a corresponding complementary RA (RAC) signal back to the first aircraft. See, U.S. Department of Transportation, Federal Aviation Administration, "Introduction to TCAS II, Version 7" (November 2000), and Minimum Operational Performance Standards (MOPS) for TCAS II Airborne Equipment, RTCA Document DO-185A (December 1997); all relevant portions of which are incorporated by reference.

A given TCAS-equipped aircraft receives and detects signals that are emitted from transponders of other aircraft on a radio frequency of 1090 MHz, both autonomously (in the case of so-called acquisition squitters) and in response to interrogation signals from the given aircraft on a frequency of 1030 MHz. Further, in addition to a pair of top and bottom-mounted fuselage antennas required by the aircraft's own transponder, a second pair of top and bottom fuselage antennas must be installed on the aircraft to implement the TCAS functions.

In view of tragic events that occurred in the United States on Sep. 11, 2001, and other special circumstances, situations may arise in which military aircraft are called upon to approach, escort or intercept a civil or commercial TCAS-equipped aircraft. In such scenarios, it would be desirable both for the civil pilot to be made aware of the proximity of the military aircraft via his/her on-board TCAS equipment and for the military pilot to acquire at least range information with respect to the civil aircraft, without either aircraft having to receive and rely upon ground-based tracking information.

U.S. Pat. No. 6,262,679 (Jul. 17, 2001) discloses a midair collision avoidance system that includes an existing TCAS configuration, and a separate tactical module for providing avoidance guidance control and display for military aircraft under formation flight and air-refueling conditions. An enhanced TCAS (ETCAS) available from Honeywell under the designation CAS-81 and for use by the military, offers operation in either a standard TCAS II mode or a formation mode. ETCAS also requires a full compliment of TCAS II equipment and associated antennas to be installed on a given aircraft.

A known configuration for a mid-air, aircraft collision avoidance system (hereafter "MCAS") intended for deployment by the military and under development by BAE SYSTEMS Advanced Systems, Greenlawn, N.Y., may be integrated and contained within currently available military airborne transponders such as, e.g., types AN/APX-117(V) and AN/APX-118(V). The system operates to alert a pilot to the presence of nearby military aircraft whose transponders emit so-called Automatic Dependent Surveillance Broadcast (ADS-B) extended squitter signals on a periodic basis. The signals are typically transmitted on a radio frequency of 1090 MHz, and in a downlink format (DF) known as DF17. The DF17 format includes position data for the associated aircraft as obtained by the global position satellite (GPS) system, velocity, and other information concerning the aircraft's identification and intent. See, e.g., MOPS for 1090 MHz ADS-B, RTCA Document DO-260 (September 2000), all relevant portions of which are incorporated by reference.

A pilot of a given MCAS-equipped aircraft is provided with a cockpit display of traffic information (CDTI) concerning other aircraft whose DF17 signals are received and processed by the on-board MCAS. The MCAS pilot may also be made aware of certain other aircraft that are being tracked by a ground station, by way of an uplink signal (in DF17 format) from the ground station that is received and processed by the on-board MCAS. The MCAS aircraft's existing pair of transponder antennas are also used for implementing the MCAS functions.

As presently configured, the above MCAS responds only to transponder or uplink signals that correspond to a limited class of aircraft. Most civil or commercial aircraft do not have transponders that transmit ADS-B extended squitter signals, but instead have Mode S transponders which emit signals in formats (e.g., DF0, DF11 or DF16) that are not recognized by MCAS. See generally, MOPS for Air Traffic Control Radar Beacon System/Mode Select (ATCRBS/Mode S) Airborne Equipment, RTCA Document DO-181 C (June 2001), all relevant portions of which are incorporated by reference.

Accordingly, if an aircraft equipped with the present MCAS enters commercial air space, the system may not respond to proximate commercial or civil aircraft that pose a collision threat. Also, if the MCAS aircraft wants to be "invisible" to a TCAS aircraft in a close approach or intercept maneuver without distracting the TCAS pilot, the MCAS pilot must turn his/her transponder system off prior to initiating the desired pass. It is of course preferable to sustain MCAS operation at all times, especially in situations where, for example, a military MCAS aircraft is called upon to escort a commercial TCAS aircraft in close formation over a long distance. Thus, while a TCAS-equipped aircraft may detect and advise its pilot to respond to the presence of a MCAS-equipped aircraft, the two collision avoidance systems are not presently configured to cooperate otherwise with one another.

Fighter and other military aircraft have little if any space available for installation of additional avionics equipment.

Thus, a configuration that will enable the above described MCAS to inter-operate with commercial TCAS-equipped aircraft without significantly enlarging the volume of MCAS equipment already on board, and without requiring additional antennas to be mounted on top and underneath the fuselage, would be highly desirable.

SUMMARY OF THE INVENTION

According to the invention, an airborne tracking and collision avoidance system for deployment on a given aircraft, includes an antenna array for mounting on an aircraft body, a transmit/receive (T/R) switch module coupled to the antenna array, and a receiver stage coupled to the switch module wherein the receiver stage (a) detects at a first radio frequency, first interrogation signals, and first collision resolution advisory (RA) signals transmitted from other nearby aircraft, and (b) detects at a second radio frequency, first acquisition signals including position information with respect to the nearby aircraft, and first reply signals from the nearby aircraft. A transmitter stage is coupled to the T/R switch module and is operative (a) to produce at the first radio frequency, second interrogation signals and second collision RA signals, and (b) to produce at the second radio frequency, second acquisition signals including position information with respect to the given aircraft, and second reply signals from the given aircraft in response to the first interrogation signals.

A system processor is coupled to the T/R switch module, the receiver stage and the transmitter stage, and the processor is configured and programmed to produce (a) tracking and collision avoidance information according to, (i) the first acquisition signals, (ii) the first reply signals and (iii) the first RA signals detected by the receiver stage, and (b) waveforms for use in the transmitter stage to produce the second acquisition signals, the second interrogation signals, and the second collision RA signals. A control unit coupled to the system processor enables an operator to set and control operating modes of the system, and a display unit coupled to the system processor produces a graphic representation of the tracking and the collision avoidance information produced by the system processor.

For a better understanding of the invention, reference is made to the following description taken in conjunction with the accompanying drawing and the appended claims.

DETAILED DESCRIPTION OF THE INVENTION

Figure 1:
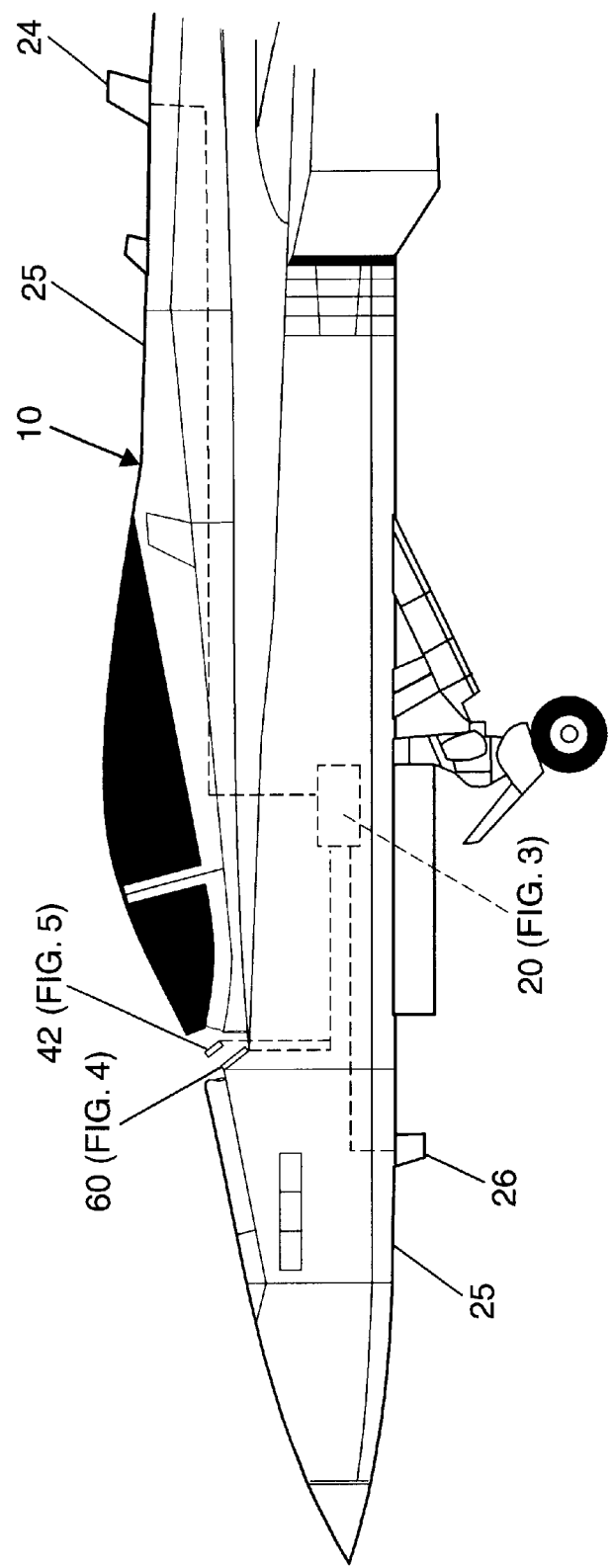
FIG. 1 is a side elevation view of a military aircraft equipped with a tracking and collision avoidance system according to the invention.
Figure 2:
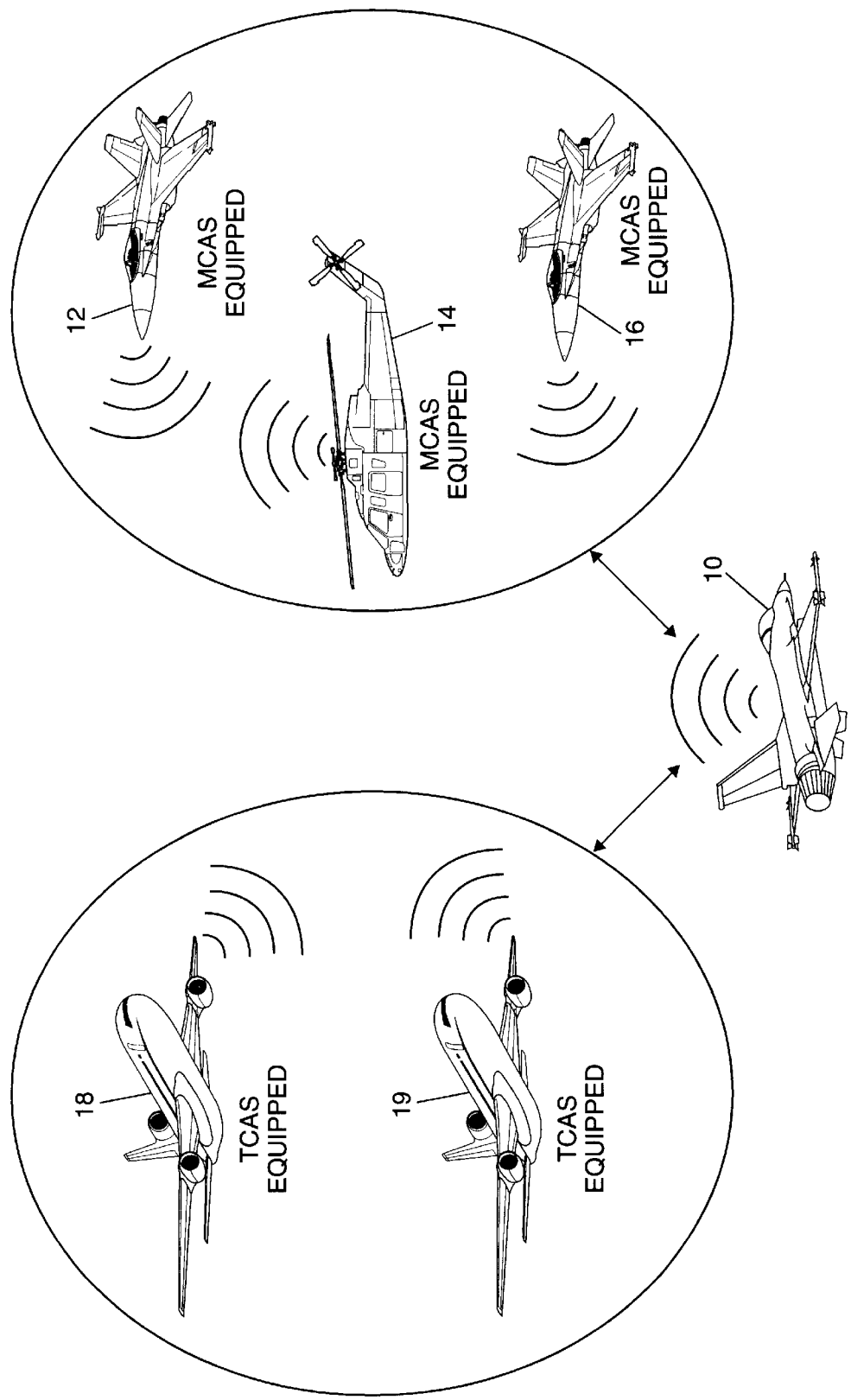
FIG. 2 is a graphic representation illustrating acquisition of tracking or collision avoidance information by the aircraft of FIG. 1 with respect to other MCAS and TCAS-equipped aircraft in its vicinity.

In FIG. 1, a given aircraft 10, e.g., a jet-powered military fighter or escort, is furnished with a system 20 (see also FIG. 3) that operates to derive tracking and collision avoidance information with respect to other, proximate transponder-equipped aircraft. As represented in FIG. 2, such other aircraft may include both MCAS-equipped aircraft 12, 14 and 16; TCAS-equipped aircraft 18, 19; and other aircraft (not shown) having only an ATCRBS Mode S transponder. The MCAS equipped aircraft may include helicopters, high performance jet fighters, and other military aircraft whose flight characteristics differ and can form the basis of collision avoidance information to be displayed to the respective pilots. The TCAS equipped aircraft may include commercial airliners, general aviation and all other aircraft for which either TCAS I or TCAS II is mandated by the applicable authorities.

Figure 3:
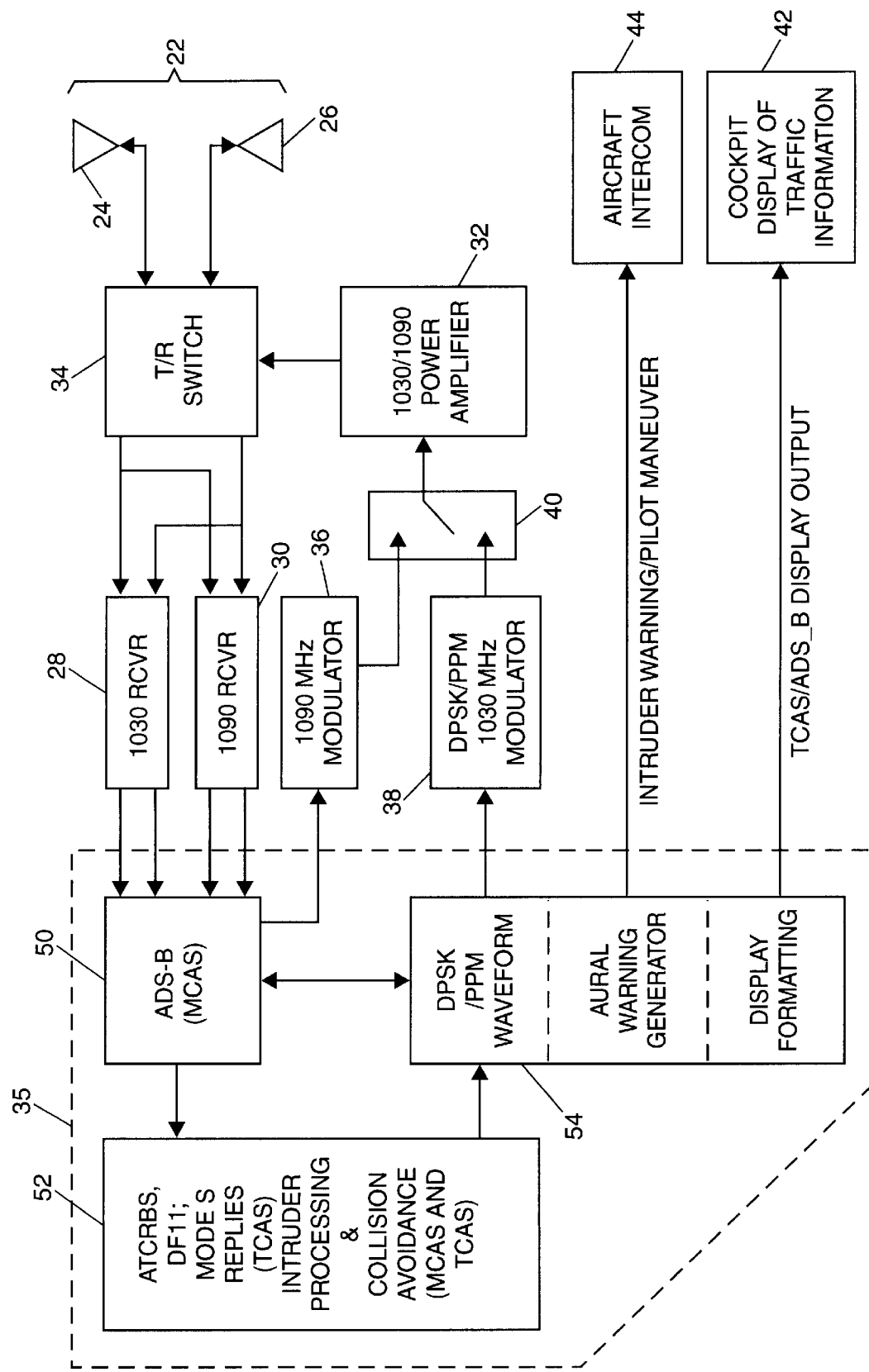
FIG. 3 is a schematic block diagram of the tracking and collision avoidance system of the invention.

FIG. 3 is a schematic diagram of the present tracking and collision avoidance system 20. The system 20 is capable of inter-operating with TCAS equipped aircraft, as well as providing the pilot with warnings of other nearby MCAS and transponder equipped aircraft. The system 20 includes an existing MCAS antenna array 22 comprising an upper antenna 24 that is mounted atop a fuselage 25 of the aircraft 10 (see FIG. 1), and a lower antenna 26 mounted beneath the aircraft fuselage 25. Each of the antennas 24, 26 may, for example, be in the form of a blade and have an omni-directional pattern at those frequencies used by both MCAS and TCAS for transponder interrogation and reply signals, i.e., 1030 MHz and 1090 MHz, respectively. In the system 20, the two antennas 24, 26 implement both MCAS and the TCAS functions. By contrast, a typical TCAS installation requires the addition of a pair of lower and upper fuselage antennas separate and apart from an existing pair of upper and lower fuselage antennas which are coupled to an aircraft's Mode S transponder.

Each of the antennas 24, 26 is selectively coupled to either (a) inputs of a 1030 MHz receiver 28 and a 1090 MHz receiver 30, or (b) an output of a RF power amplifier 32. The power amplifier 32 operates to provide, for example, approximately 500 watts of RF power to the antennas 24, 26 for transmission of interrogation signals and the RA and RAC signals associated with TCAS II, at 1030 MHz. Amplifier 32 also supplies the earlier mentioned ADS-B extended squitter signals for transmission from the antennas 24, 26 at 1090 MHz. The antennas 24, 26 are selectively connected to either the inputs of the receivers 28, 30, or the output of the power amplifier 32, through a transmit/receive (T/R) switch module 34 the operation of which is controlled by a suitably programmed system processor 35.

A first transmitter/modulator 36 is constructed and arranged to produce the ADS-B extended squitter signals at 1090 MHz autonomously on a periodic basis, and to provide reply signals at 1090 MHz from the aircraft 10 in response to interrogation signals received at 1030 MHz from nearby TCAS-equipped aircraft or ground stations. A second transmitter/modulator 38 is provided as a source of interrogation signals, RA and RAC signals at 1030 MHz for transmission from the aircraft 10 to nearby TCAS-equipped aircraft. Depending on the instant mode of operation of the system 20, either an output of the transmitter 36 or an output of the transmitter 38 is coupled to an input of the power amplifier 32 through a RF switch 40 under the control of the processor 35.

A pilot of the aircraft 10 provides input commands to the system 20 and is apprised of the system's status and other operating information, by way of a remote control unit (RCU) 60. See FIG. 4. The RCU 60 is preferably mounted for convenient access by the pilot inside the aircraft cockpit, and has a light emitting diode (LED) panel 62 for displaying and confirming information entered by the pilot via an alphanumeric keypad 64 for each of a number of menu-selected items. Menu options are viewed by actuating a rocker switch 66 either up (+) or down (-), and displaying an item for which data is to be entered by the pilot on the panel 62, for example, a transponder code for a selected IFF mode.

Figure 4:
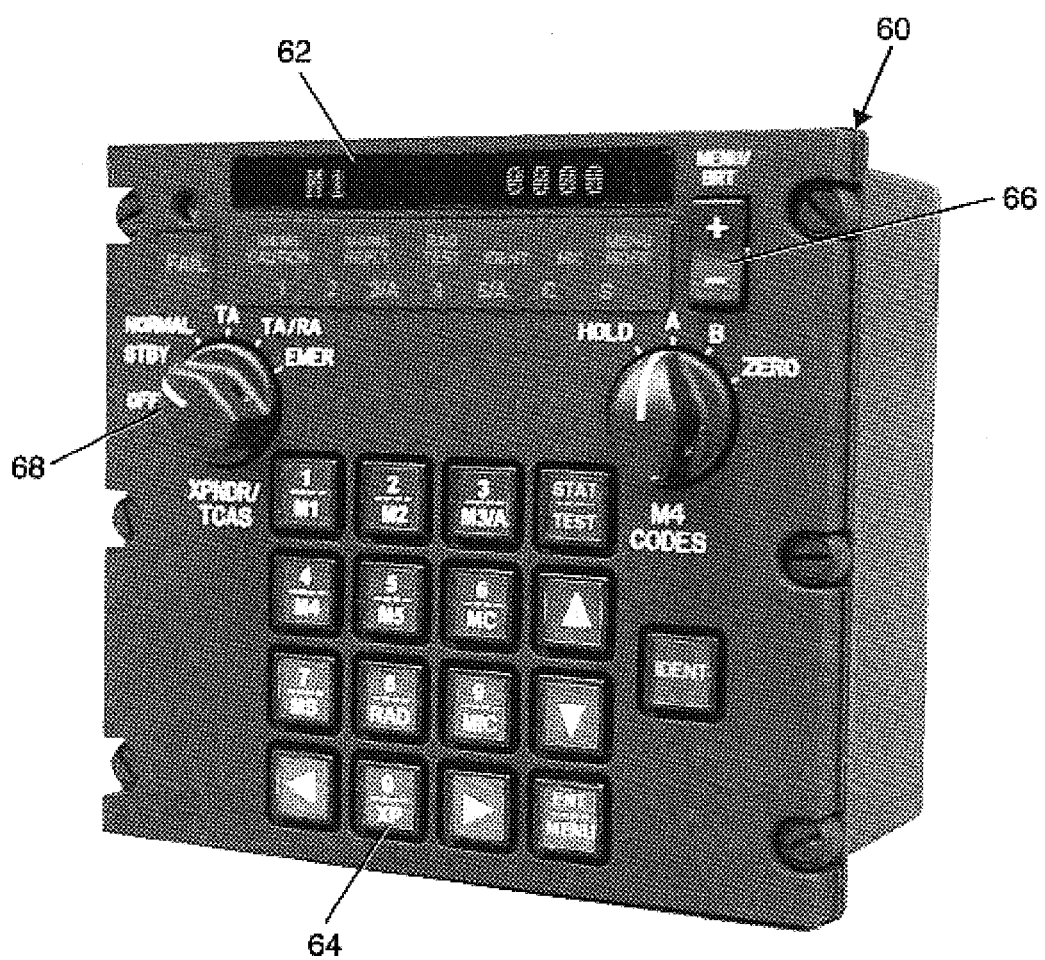
FIG. 4 is a view of a control unit that may be used by a pilot to interface with the system of FIG. 3.

A multi-position master transponder switch 68 at the upper left of the RCU 60 in FIG. 4, allows the pilot to place the system 20 in a desired operating mode. For example, a standby (STBY) position for the switch serves to energize the system receivers 28, 30 to allow reception of acquisition squitters and interrogations, but disables the system transmitter/modulators 36, 38. A NORMAL position for the switch 68 enables transponder operation, i.e., the transmitters 36, 38 are energized and desired IFF transponder modes (e.g., Mode 4, Mode 5 and Mode S) can be programmed via the menu rocker switch 66, the keypad 64, and the display panel 62. A TA position for the switch 68 sets the system 20 to emulate a TCAS I collision avoidance mode in addition to the earlier described MCAS function. That is, the pilot is provided with a display of proximate intruding or target aircraft, but without any exchange of coordinated collision avoidance information. A TA/RA position for the switch 68 enables the system 20 to emulate a TCAS II collision avoidance mode in addition to MCAS operation. As explained below, when performing the TCAS II functions, the system 20 preferably always assumes a "slave" role when exchanging resolution advisory information with other, proximate TCAS II equipped aircraft.

Figure 5:
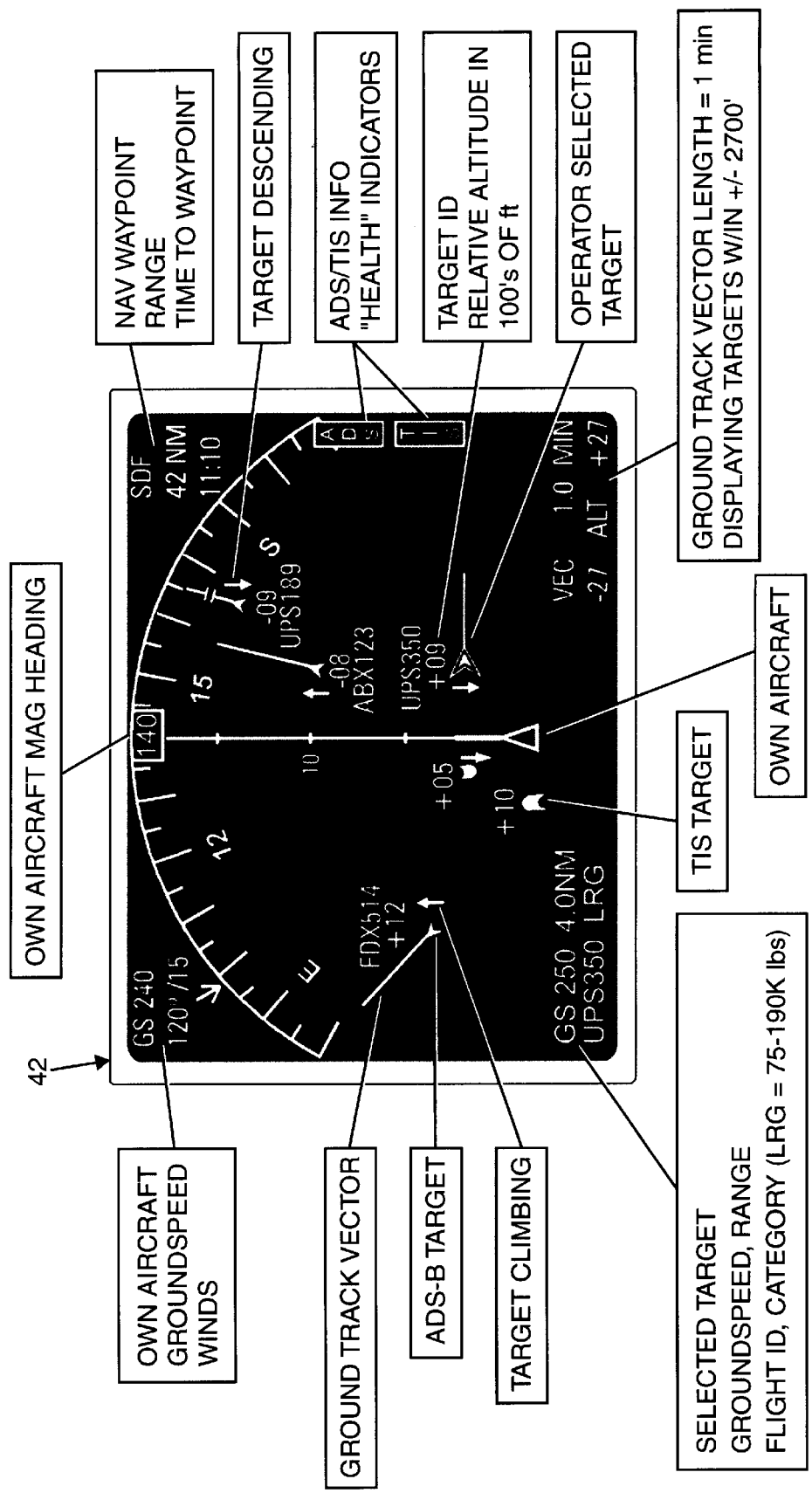
FIG. 5 is a cockpit display that may be used to show tracking and collision avoidance information with respect to proximate aircraft as derived by the system of FIG. 3.

A cockpit display of traffic information (CDTI) 42, shown in FIG. 5, provides a pilot with visual awareness of MCAS, TCAS and other transponder-equipped aircraft within a surveillance range. The CDTI 42 is preferably mounted near or adjacent to the RCU 60 in the aircraft cockpit, and in the pilot's field of view. Warnings and maneuver commands are annunciated via an aircraft intercom 44. Both the CDTI 42 and the intercom 44 are driven from associated interfaces (not shown) based on information provided by the system processor 35. The display markings and nomenclature shown in FIG. 5 may be the same or similar to those used for typical TCAS TA/RA or VSI displays, and can be readily understood and interpreted by those familiar with existing TCAS systems. The CDTI 42 may also be constructed as a heads-up display (HUD).

In FIG. 3, the system processor 35 is configured at 50 to process either ADS-B extended squitter signals as output from the receiver 30, or interrogation signals received from other aircraft or ground stations at 1030 MHz as output from the receiver 28. At 52, the processor is represented as being configured to operate on received ATCRBS, DF11 acquisition squitters, and discrete Mode S replies typically emitted by other aircraft in a TCAS I or TCAS II environment. The system processor 35 is also configured to operate, at 54, to provide a waveform generator function that enables pulse position modulation (PPM) for ATCRBS/Mode S All-Calls and ATCRBS-only All-Calls, as defined in a TCAS environment. Further, the processor 35 is configured to generate a differential phase shift keying (DPSK) waveform which is used in modulating the TCAS Mode S interrogation signals at 1030 MHz for intruder tracking, and when transmitting RA and RAC signals from the aircraft 10 to TCAS II equipped aircraft within range.

MCAS-specific collision avoidance algorithms are also stored in the processor 35 (at 52), and are augmented to function with range, range rate and range acceleration information as acquired when in a TCAS operating mode. The collision avoidance algorithms are specifically tailored for unique flight characteristics of the aircraft 10, since current civil TCAS algorithms do not provide solutions for helicopters or high performance jet fighters. Accordingly, the algorithms should be tailored specifically for the platform application, e.g., fighter, helicopter, cargo, or the like. Also, as mentioned, the processor 35 may be programmed and configured to implement a vocoder function to annunciate typical TCAS advisory command terms such as, e.g., CLIMB, DESCEND, and the like.

EXAMPLE I

Intruding or Target Aircraft Lacking TCAS or Having TCAS I Equipment Only

When encountering an aircraft having only TCAS I capability, or lacking any TCAS ability, the present system 20 acquires, tracks and displays the target. Specifically, the system processor 35 is programmed to monitor via the 1090 MHz receiver 30 for acquisition squitter signals that are transmitted randomly in, e.g., a DF11 format by other Mode S transponder-equipped aircraft within range. If a DF11 acquisition squitter signal is detected, the processor 35 operates to cause the 1030 MHz transmitter/modulator 38 to interrogate the target using a Mode S address that is derived from the target's squitter signal, and to establish a range, range rate and relative altitude with respect to the target.

For proximate aircraft that do not transmit acquisition squitter signals of any kind, the processor 35 is preferably configured to cause the system transmitter 38 to produce interrogation signals at 1030 MHz in the form of ATCRBS/Mode S All-Calls to locate such other aircraft. Aircraft that are so located are then actively interrogated to establish tracking parameters on them.

When a protective zone (tau time to closest point of intercept) with respect to the aircraft 10 is to be invaded, the threat is displayed via the CDTI 42 with formulated visual cues and aural advisories (CLIMB, DESCEND, INCREASE DESCENT, or the like) through the intercom 44, instructing the pilot to avoid a potential collision. Because there is no exchange of RA signals in a TCAS I encounter, the system 20 only provides collision avoidance advisories (TAs) to the pilot of the aircraft 10 in which the present system 20 is installed.

EXAMPLE II

Encounters with TCAS II Equipped Aircraft

In an encounter with another aircraft in which TCAS II equipment is installed, the system processor 35 is configured and programmed to acquire, track and display the target aircraft to the pilot, similar to the operation of a typical TCAS II system. When the protective zone about the aircraft 10 is to be invaded, the threat and formulated visual cues are provided to the pilot via the CDTI 42 together with aural advisories via the intercom 44, thus aiding the pilot to avert a potential collision. Unlike a typical TCAS II system, however, the processor 35 of the system 20 is preferably programmed so as not to initiate coordinated resolution advisories (RAs) with the target or threat aircraft.

That is, the system 20 effectively forces the encountered TCAS II system to become the "master" in a typical TCAS II conflict resolution process, and to determine its own resolution advisory and transmit a corresponding RA signal at 1030 MHz to the aircraft 10. Once the processor 35 determines the intended path of the target aircraft, the processor operates (at 52) to determine a course of action, i.e., a resolution advisory complement, such as would continue to mitigate the collision threat without entering a crossing scenario. A corresponding RAC signal is then transmitted to the target aircraft via the 1030 MHz transmitter/modulator 38.

Accordingly, unlike a typical TCAS II system in which an aircraft that has a lower Mode S address becomes the "master", the system 20 always assumes the "slave" role in resolving the conflict. The intruding TCAS II aircraft is thus allowed to resolve the conflict in a manner having least impact to its intended flight path.

With respect to future upgrades for the commercial and general aviation TCAS collision avoidance algorithms, an ability to identify military platforms and to discriminate them from civil or commercial aircraft, should be established. Military aircraft generally have more freedom and capability to alter their flight paths temporarily for the purpose of avoiding a collision, than certain larger civilian or commercial aircraft. The avoidance algorithms may therefore be tailored so that a civil aircraft minimizes the impact of an avoidance maneuver to its intended flight path, and a military aircraft with a collision avoidance system the same or similar to the system 20 will always assume the "slave" role during a coordinated resolution advisory signal exchange with the civil aircraft in normal flight operations.

EXAMPLE III

Military Intercept

The current TCAS version 7.0 has no provision to alert a commercial aircraft of an imminent military intercept maneuver. As suggested earlier, recent events may result in an upgrade of current TCAS algorithms to include reception of a military intercept command with associated commanded flight maneuvers.

TCAS II systems presently attempt to maintain a safe vertical separation between approaching aircraft. Accordingly, upon entry of a menu-selected "Intercept" operation mode via the RCU 60, collision avoidance algorithms within the processor 35 that would otherwise instruct the pilot to climb or descend to achieve a safe vertical separation are inhibited so as not to distract the pilot from an intercept maneuver. When in the Intercept mode, the processor 35 may also be programmed to cause the transmitter/modulator 38 to send Vertical Speed Limit (VSL) RA signals to the target aircraft calling for "zero feet per minute", so that a TCAS II system aboard the target aircraft will effectively advise the TCAS II pilot to maintain level flight.

Once detecting transponder reply signals at 1090 MHz from the transmitter 36 of the present system 20, the TCAS II aircraft may nonetheless attempt to maneuver away from the impending conflict and will also formulate and issue corresponding RA signals to the intercepting aircraft 10. Thus, when in the intercept mode, the processor 35 of the system 20 should preferably be programmed so as not to acknowledge any received RA signals but, rather, to continue to transmit level flight RA signal commands to the TCAS II pilot. Notwithstanding a recognition of a level flight command, current TCAS systems may still attempt to command the TCAS pilot to climb or descend to maintain a safe vertical separation. Accordingly, the recognition of a military intercept command and of corresponding commanded flight parameters, are features that should be considered in future upgrades of TCAS so as to facilitate the intercept scenario.

Existing commercial TCAS systems do utilize a directional antenna to glean bearing information for nearby aircraft. Nonetheless, basic TCAS collision avoidance algorithms predominantly use range, range rate, range acceleration and altitude to provide a collision avoidance function. While bearing information may be used in the collision avoidance algorithm, it is not a necessary parameter. Bearing information is also used to display a threat to a pilot on a TCAS display. If bearing information does not exist, however, traffic displays include provisions for "No Bearing Messages", and show range and relative altitude of a threat aircraft to the pilot. That is, knowledge of proximate aircraft by range and relative altitude alone often suffices to provide adequate situational awareness to the pilot.

Without the use of directional interrogation antennas, bearing information may still be determined by the present system 20 if an intruding aircraft also reports its position data via the ADS-B acquisition squitters. Active interrogations by the system 20 may be used to validate the ADS-B position data reported by the aircraft, thus eliminating a safety risk of introducing data obtained by means other than a TCAS function for use in a TCAS avoidance algorithm.

The existing Air Traffic Control system presumes that an aircraft's transponder will have some minimal availability. Because TCAS surveillance and tracking functions will typically result in a transmit duty cycle of less than 1% for the present system 20, the system will otherwise be available more than 98% of the time for normal transponder air-ground and air—air surveillance replies.

To improve the situational awareness of the pilot when in a collision avoidance mode, the system 20 monitors 1090 MHz for Mode S acquisition squitters which are transmitted periodically by other aircraft to allow the system to acquire new intruders per stored TCAS algorithms. Upon receipt of an acquisition squitter from a new intruder, the system 20 is configured actively to interrogate and to determine range and range rate of the intruder. The system is also preferably configured to interrogate its surroundings actively using ATCRBS/Mode S All-Calls and ATCRBS-only All-Calls to acquire any aircraft having Mode 3/A and Mode C transponders (i.e., no Mode S capability and no means to transmit acquisition squitters). Any replies are processed and provided in the form of a graphic display on the CDTI 42. In the absence of bearing information for proximate aircraft, a "No-Bearing" alert may nonetheless display the range and the relative altitude of a detected intruder. Thus, the pilot is made aware of the intruder at a determined range and altitude difference, even without bearing information.

Using the single pair of antennas 24, 26, an approximately 500 watt RF power level for the amplifier 32, and typical Mode S transponder sensitivities for the receivers 28, 30; the interrogation range of the system 20 will be nominally 25 nautical miles. Depending on the geometry between the aircraft 10 and an aircraft to be interrogated, i.e., the elevation angle between the active antennas on the two aircraft, the range may be greater. The performance of a typical TCAS II directional antenna and a transponder blade antenna are comparable. Transmit powers may be higher under TCAS II specifications since TCAS II systems are expected to provide 40 nautical mile coverage surrounding own ship. The present system 20 should provide reliable coverage of at least 25–30 nautical miles surrounding own ship. And, because the 1090 MHz receiver 30 of the system preferably has equal if not more sensitivity than a typical TCAS receiver in order to receive the ADS-B acquisition squitters, the range over which the system 20 is capable of receiving transponder replies to its interrogations is comparable, if not better, than the interrogation reply range of existing TCAS systems.

In sum, the system 20 provides an enhanced situational awareness to a military pilot by processing acquisition squitters received from proximate Mode S equipped aircraft, and by actively interrogating non-ADS-B aircraft. The system 20 emulates basic TCAS operations by providing collision avoidance maneuver advisories to a pilot of the aircraft 10; and coordinated, resolution advisories (RAs or RACs) to pilots of proximate TCAS II equipped aircraft. Mode S/ATCRBS interrogation capability is provided so that other transponder equipped aircraft can be identified and tracked to provide collision avoidance. The system 20 provides safety features that until now could only be offered by platforms that occupy the space needed for a complete TCAS system installation and require more than one pair of upper and lower aircraft fuselage antennas.

While the foregoing description represents preferred embodiments of the invention, it will be obvious to those skilled in the art that various changes and modifications may be made, without departing from the spirit and scope of the invention pointed out by the following claims. For example, to support formation flying or in-flight fueling operations, the system processor 35 may also be configured and programmed to allow a pilot to identify unique squadron aircraft. Information concerning squadron aircraft, e.g., an aircraft's Mode 3/A code or Mode S address, may be input to the system 20 by way of the RCU 60. Also, during military flight operations, a so-called interrogator locator (IL) function that might otherwise be implemented when in a TCAS mode, may be disabled upon pilot command to minimize interference to civil air traffic control and to nearby airborne civilian TCAS systems.

We claim:

1. An integrated transponder and collision avoidance system for deployment on a given aircraft, comprising:
    an antenna array constructed and arranged for emitting and receiving signals within a certain range of the given aircraft at one or more defined radio frequencies;
    a receiver stage arranged to be coupled to the antenna array, wherein the receiver stage is constructed and arranged to detect,
        (i) first interrogation signals transmitted to the given aircraft,
        (ii) first resolution advisory (RA) signals directed to the given aircraft from nearby aircraft having certain collision avoidance systems on board, the first RA signals containing information relating to a collision avoidance maneuver that is determined by the nearby aircraft,
        (iii) first acquisition signals emitted from nearby aircraft and containing certain information with respect to the nearby aircraft, and
        (iv) first reply signals transmitted from nearby aircraft in response to interrogation signals transmitted to the nearby aircraft;
    a transmitter stage arranged to be operatively coupled to the antenna array, wherein the transmitter stage is constructed and arranged to produce,
        (i) second interrogation signals for transmission to nearby aircraft,
        (ii) second RA signals for transmission to the nearby aircraft that have the collision avoidance systems on board, the second RA signals containing information relating to a collision avoidance maneuver that is determined by the given aircraft,
        (iii) second acquisition signals containing certain information with respect to the given aircraft, and
        (iv) second reply signals in response to received first interrogation signals;
    a system processor coupled to the receiver stage and to the transmitter stage for controlling operations of the receiver stage and the transmitter stage, wherein the processor is configured to produce (a) tracking and collision avoidance information according to information contained in signals detected by the receiver stage, and (b) waveforms for use in defining signals for transmission by the transmitter stage;
    a control unit coupled to the system processor, wherein the control unit and the processor are constructed and arranged to enable a pilot of the given aircraft to select and to control operating modes of the system including a collision avoidance mode of operation that interoperates with the collision avoidance systems on board the nearby aircraft, wherein the system processor is configured always to await detection by the receiver stage of the first RA signals from the nearby aircraft, and then to produce the second RA signals in a form representing collision avoidance maneuver information that is coordinated with the information contained in the detected first RA signals, so that the nearby aircraft is always allowed to resolve a potential collision conflict in a manner having least impact on an intended flight path of the nearby aircraft; and
    a display unit coupled to the system processor, wherein the display unit is configured to produce a graphic representation of the tracking and collision avoidance information produced by the system processor.

2. A system according to claim 1, wherein the radio frequencies include at least one of 1030 MHz and 1090 MHz.

3. A system according to claim 1, wherein the antenna array comprises an omni-directional antenna mounted on an upper portion of a fuselage of the given aircraft, and an omni-directional antenna mounted on a lower portion of said fuselage.

4. A system according to claim 1, wherein the receiver stage is operative to detect first acquisition signals that contain information relating to a position of the nearby aircraft, and the system processor is configured to determine said position.

5. A system according to claim 4, wherein the first acquisition signals are in the form of Automatic Dependent Surveillance Broadcast (ADS-B) squitter signals.

6. A system according to claim 1, wherein the system processor is configured to enable the system to function in a transponder mode of operation.

7. A system according to claim 6, wherein the control unit is constructed and arranged to enable a code corresponding to a selected transponder mode to be entered manually by the pilot of the given aircraft.

8. A system according to claim 1, wherein the system processor is configured to process certain information concerning squadron aircraft, and wherein the control unit is arranged to enable said information to be entered manually by the pilot of the given aircraft.

9. A system according to claim 8, wherein the information concerning squadron aircraft corresponds to a squadron's transponder code or Mode S address.

10. A system according to claim 1, wherein the control unit and the system processor are constructed and arranged to enable a pilot of the given aircraft to select an intercept mode of operation in which second RA signals when transmitted to a target aircraft by the transmitter stage, contain information corresponding to a command for the target aircraft to maintain level flight.

11. A system according to claim 10, wherein the system processor is configured not to respond to first RA signals transmitted from the target aircraft to the given aircraft when in the intercept mode of operation, and to continue to produce the second RA signals commanding the target aircraft to maintain level flight.

12. A system according to claim 1, including a transmit/receive (T/R) switch module coupled to the antenna array and to the system processor, and wherein an input of the receiver stage and an output of the transmitter stage are coupled to the T/R switch module.

13. An integrated transponder and collision avoidance system for deployment on a given aircraft, comprising:

an antenna array constructed and arranged for emitting and receiving signals within a certain range of the given aircraft at one or more defined radio frequencies;

a receiver stage arranged to be coupled to the antenna array, wherein the receiver stage is constructed and arranged to detect,
   (i) first interrogation signals transmitted to the given aircraft,
   (ii) first resolution advisory (RA) signals directed to the given aircraft from nearby aircraft having certain collision avoidance systems on board, the first RA signals containing information relating to a collision avoidance maneuver that is determined by the nearby aircraft,
   (iii) first acquisition signals emitted from and containing certain information with respect to the nearby aircraft, and
   (iv) first reply signals transmitted from the nearby aircraft in response to interrogation signals transmitted to the nearby aircraft;

a transmitter stage arranged to be operatively coupled to the antenna array, wherein the transmitter stage is constructed and arranged to produce,
   (i) second interrogation signals for transmission to the nearby aircraft,
   (ii) second RA signals for transmission to the nearby aircraft that have the collision avoidance systems on board, the second RA signals containing information relating to a maneuver that is determined by the given aircraft,
   (iii) second acquisition signals containing certain information with respect to the given aircraft, and
   (iv) second reply signals in response to received first interrogation signals;

a system processor coupled to the receiver stage and to the transmitter stage for controlling operations of the receiver stage and the transmitter stage, wherein the processor is configured to produce (a) tracking and collision avoidance information according to information contained in signals detected by the receiver stage, and (b) waveforms for use in defining signals for transmission by the transmitter stage;

a control unit coupled to the system processor, wherein the control unit and the processor are constructed and arranged to enable a pilot of the given aircraft to select and to control operating modes of the system, including an intercept mode of operation that interoperates with the collision avoidance system on board a nearby target aircraft, wherein the processor is configured to produce the second RA signals in a form that commands the system aboard the target aircraft to maintain level flight and does not respond to any detected first RA signals from the target aircraft; and a display unit coupled to the system processor, wherein the display unit is configured to produce a graphic representation of the tracking and collision avoidance information produced by the system processor.

14. A system according to claim 13, wherein the radio frequencies include at least one of 1030 MHz and 1090 MHz.

15. A system according to claim 13, wherein the antenna array comprises an omni-directional antenna mounted on an upper portion of a fuselage of the given aircraft, and an omni-directional antenna mounted on a lower portion of said fuselage.

16. A system according to claim 13, wherein the receiver stage is operative to detect first acquisition signals that contain information relating to a position of the target aircraft, and the system processor is configured to determine said position.

17. A system according to claim 16, wherein the first acquisition signals are in the form of Automatic Dependent Surveillance Broadcast (ADS-B) squitter signals.

18. A system according to claim 13, wherein the system processor is configured to enable the system to function in a transponder mode of operation.

19. A system according to claim 18, wherein the control unit is constructed and arranged to enable a code corresponding to a selected transponder mode to be entered manually by the pilot of the given aircraft.

20. A system according to claim 13, wherein the system processor is configured to process certain information concerning squadron aircraft, and wherein the control unit is arranged to enable said information to be entered manually by the pilot of the given aircraft.

21. A system according to claim 20, wherein the information concerning squadron aircraft corresponds to a squadron's transponder code or Mode S address.

22. A system according to claim 13, including a transmit/receive (T/R) switch module coupled to the antenna array and to the system processor, and wherein an input of the receiver stage and an output of the transmitter stage are coupled to the T/R switch module.

23. An integrated transponder and collision avoidance system for deployment on a given aircraft, comprising:

an antenna array constructed and arranged for emitting and receiving signals within a certain range of the given aircraft at one or more defined radio frequencies;

a receiver stage arranged to be coupled to the antenna array, wherein the receiver stage is constructed and arranged to detect,
   (i) first interrogation signals transmitted to the given aircraft,
   (ii) first resolution advisory (RA) signals directed to the given aircraft from nearby aircraft having certain collision avoidance systems on board, the first RA signals containing information relating to a collision avoidance maneuver that is determined by the nearby aircraft,
   (iii) first acquisition signals emitted from and containing certain information with respect to the nearby aircraft, and
   (iv) first reply signals transmitted from the nearby aircraft in response to interrogation signals transmitted to the nearby aircraft;

a transmitter stage arranged to be operatively coupled to the antenna array, wherein the transmitter stage is constructed and arranged to produce, (i) second interrogation signals for transmission to the nearby aircraft, (ii) second RA signals for transmission to the nearby aircraft that have the collision avoidance systems on board, the second RA signals containing information relating to a maneuver that is determined by the given aircraft, (iii) second acquisition signals containing certain information with respect to the given aircraft, and (iv) second reply signals in response to received first interrogation signals;

a system processor coupled to the receiver stage and to the transmitter stage for controlling operations of the receiver stage and the transmitter stage, wherein the processor is configured to produce (a) tracking and collision avoidance information according to information contained in signals detected by the receiver stage, and (b) waveforms for use in defining signals for transmission by the transmitter stage;

a control unit coupled to the system processor, wherein the control unit and the processor are constructed and arranged to enable a pilot of the given aircraft to select and to control operating modes of the system, including (i) a collision avoidance mode that interoperates with the collision avoidance systems on board the nearby aircraft, wherein the system processor is configured always to await detection by the receiver stage of the first RA signals from the nearby aircraft, and then to produce the second RA signals in a form representing collision avoidance maneuver information that is coordinated with the information contained in the detected first RA signals, so that the nearby aircraft is always allowed to resolve a potential collision conflict in a manner having least impact on an intended flight path of the nearby aircraft, and (ii) an intercept mode of operation wherein the processor is configured to produce the second RA signals in a form that commands the system aboard the target aircraft to maintain level flight and does not respond to any first RA signals detected from the target aircraft; and a display unit coupled to the system processor, wherein the display unit is configured to produce a graphic representation of the tracking and collision avoidance information produced by the system processor.

24. A system according to claim 23, wherein the antenna array comprises an omni-directional antenna mounted on an upper portion of a fuselage of the given aircraft, and an omni-directional antenna mounted on a lower portion of said fuselage.

25. A system according to claim 23, wherein the receiver stage is operative to detect first acquisition signals that contain information relating to a position of the nearby aircraft, and the system processor is configured to determine said position.

26. A system according to claim 25, wherein the first acquisition signals are in the form of Automatic Dependent Surveillance Broadcast (ADS-B) squitter signals.

27. A system according to claim 23, wherein the system processor is configured to enable the system to function in a transponder mode of operation.

28. A system according to claim 27, wherein the control unit is constructed and arranged to enable a code corresponding to a selected transponder mode to be entered manually by the pilot of the given aircraft.

29. A system according to claim 23, wherein the system processor is configured to process certain information concerning squadron aircraft, and wherein the control unit is arranged to enable said information to be entered manually by the pilot of the given aircraft.

30. A system according to claim 29, wherein the information concerning squadron aircraft corresponds to a squadron's transponder code or Mode S address.

* * * * *